United States Patent [19]

Sarma

[11] Patent Number: 5,191,452
[45] Date of Patent: Mar. 2, 1993

[54] ACTIVE MATRIX LIQUID CRYSTAL DISPLAY FABRICATION FOR GRAYSCALE

[75] Inventor: Kalluri R. Sarma, Mesa, Ariz.

[73] Assignee: Honeywell Inc., Minneapolis, Minn.

[21] Appl. No.: 410,185

[22] Filed: Sep. 20, 1989

[51] Int. Cl.[5] .............................. G02F 1/13
[52] U.S. Cl. ...................... 359/59; 359/68; 359/54
[58] Field of Search .............. 359/54, 55, 57, 58, 359/59, 68, 56

[56] References Cited

U.S. PATENT DOCUMENTS

| | | | |
|---|---|---|---|
| 4,431,271 | 2/1984 | Okubo | 359/58 |
| 4,709,990 | 12/1987 | Oana | 359/54 |
| 4,712,877 | 12/1987 | Okada et al. | |
| 4,770,498 | 9/1988 | Aoki et al. | 359/59 |
| 4,840,460 | 6/1989 | Bernot et al. | 359/59 |
| 4,934,791 | 6/1990 | Shimizu et al. | 359/68 |

FOREIGN PATENT DOCUMENTS 0271960  6/1988  European Pat. Off.
0289415 11/1988  European Pat. Off.

OTHER PUBLICATIONS

"Active—Matrix LCDs Using Gray-Scale in Halftone Methods" K. Sarma et al., SID 89 Digest, May 16, 1989.
Abstract from vol. 11, No. 270, publication No. 62070815, Patent abstracts of Japan, Sep. 3, 1987.

Primary Examiner—Andrew J. James
Assistant Examiner—Courtney Bowers
Attorney, Agent, or Firm—John G. Shudy, Jr.

[57] ABSTRACT

A structure and method of fabricating a active matrix display with halftone grayscale and wide viewing angle, having an active matrix array and a control capacitor array fabricated on separate substrates.

7 Claims, 14 Drawing Sheets

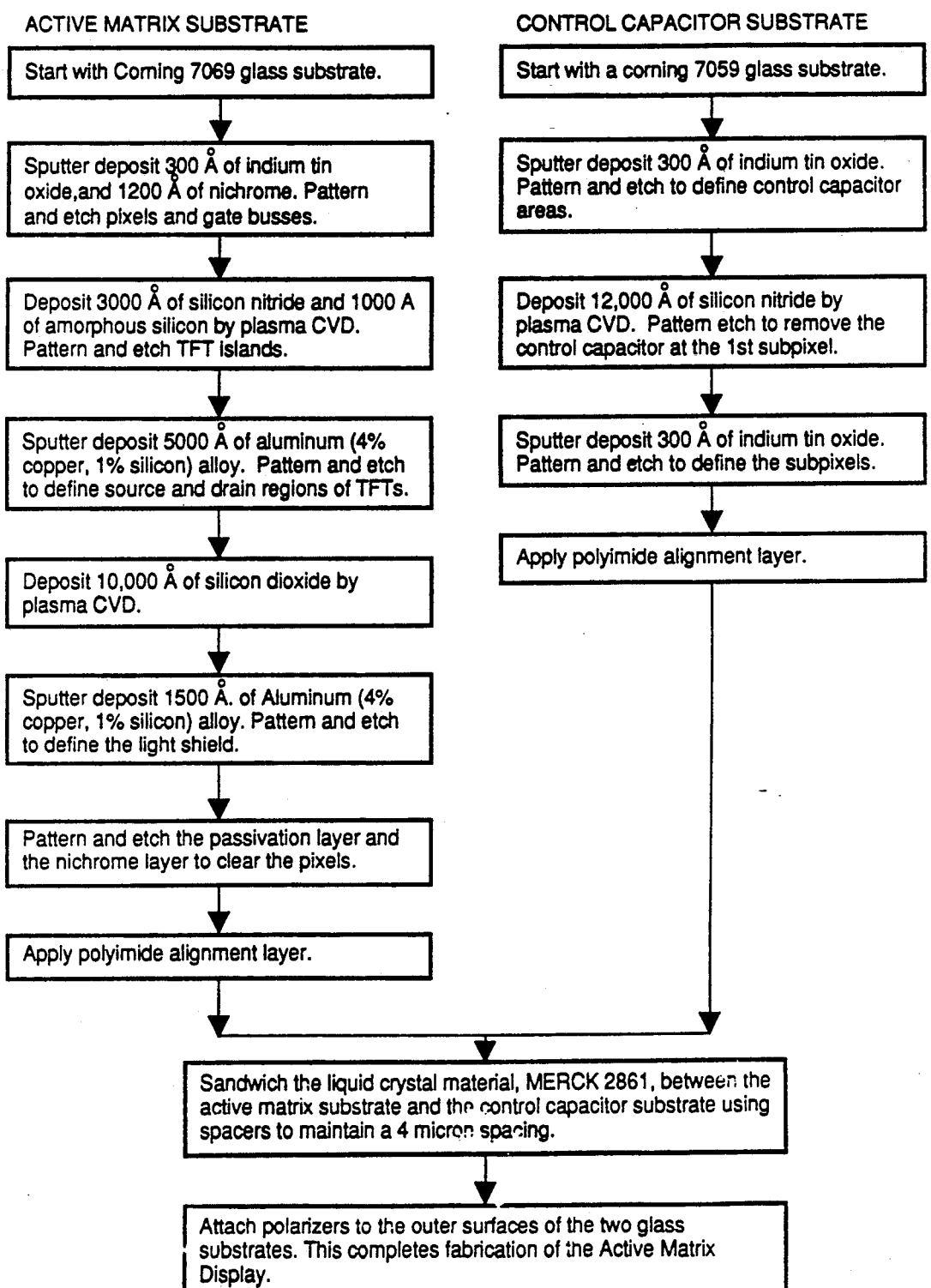
Fig. 13 ACTIVE MATRIX DISPLAY FABRICATION

ACTIVE MATRIX LIQUID CRYSTAL DISPLAY FABRICATION FOR GRAYSCALE

FIELD OF INVENTION

The present invention relates to liquid crystal displays, and particularly to active matrix liquid crystal displays (AMLCDs). More particularly, the invention pertains to AMLCD fabrication having a grayscale with an improved viewing angle.

BACKGROUND OF INVENTION

AMLCDs with a flat form factor have a demonstrated potential for reducing the weight, volume, power requirement, and cost, as well as for providing enhanced reliability compared to those factors of conventional cathode ray tube (CRT) displays. However, one significant problem with AMLCD panels has been the difficulty in achieving grayscale with adequate viewing angle. A number of display applications require wide-viewing angle grayscale and, without this, applications of AMLCD panels will be severely restricted.

In related art, a method for generating grayscales in an AMLCD having a wide viewing angle and using a half-tone approach, already has been developed. Half-toning is accomplished by subdividing each pixel into a number of subpixels, and incorporating a control capacitor in series with each subpixel. The control capacitors act as voltage dividers. By using a proper choice of values for the control capacitors, the voltages across the subpixels are varied such that, as each subpixel is selected to be turned-on, the voltage across it is at or above saturation voltage, while the voltages across the unselected subpixels are at or below threshold voltage. For any gray level selected by varying the thin film transistor (TFT) source voltage, at the most, only one subpixel will be between the threshold voltage ($V_{th}$) and saturation voltage ($V_s$). This significantly reduces the viewing angle dependence of the pixel luminance and grayscale. The control capacitor capacitance that determines a particular voltage value of the selected pixel, is adjusted by variation in its area or thickness of the dielectric. In related art, the control capacitors and the active matrix array are fabricated at the same time on the same substrate.

One major problem with the related art approach is that design and processing trade-offs are required when fabricating an active matrix array having control capacitors on the same substrate. These trade-offs result in a detrimental effect on performance and yield. The active matrix substrate includes several thin films and processing steps. In the conventional active matrix substrate fabrication, the thin films, their thicknesses and the processing parameters are selected to optimize the performance and yield of the TFTs, and thus of the display. However, incorporation of control capacitors on the same substrate results in non-optimum film thicknesses or processing conditions for the TFT switching devices and/or the control capacitors.

The following instance illustrates a problem of related-art fabrication. The control capacitors, utilizing area variation as means for capacitance variation, require a second transparent conductive electrode, which is generally indium tin oxide (ITO). The second ITO layer is deposited after the TFT array fabrication is complete. For optimum ITO deposition conditions, the substrate will have to be heated in excess of 300° Centigrade (C). But this high temperature cycle degrades the properties of the a-Si TFTs.

To minimize the total number of process steps in fabrication, the TFT passivation layer is also used as a dielectric in the control capacitors with area variation. The choice of the dielectric and its thickness for the TFT passivation layer are determined by the dielectric/semiconductor interface properties and the step coverage issues. However, the choice of the dielectric and its thickness for the control capacitors is determined by the needed capacitance values for the control capacitors. These requirements of the dielectric and its thickness for TFTs and the control capacitors are usually not in agreement, and thus trade-offs need to be made if the same dielectric layer is to be used for TFT passivation as well as for control capacitors. Similarly, while the dielectric in the TFT structure can be used in the fabrication of control capacitors with thickness variation, the dielectric thickness requirements for the TFT structure and the control capacitors are quite different.

Another problem is that the conventional approach of the related art increases the number of processing steps (masking levels) for the TFT substrate. A greater number of steps increases the defect levels in the display and lowers the manufacturing yield. Negligible defect levels and high manufacturing yields are essential for the success of AMLCD panels. So, because the yields and costs are adversely affected as the number of masking levels and the process steps is increased, the related art requires design and process trade-offs to minimize the number of mask levels required for the fabrication of the active matrix substrates. Accordingly, a need exists to develop a method of manufacturing the halftone grayscale displays with control capacitors that does not require design and process trade-offs with resulting performance and yield degradation. The present invention responds to that need by separating the control capacitors from the active matrix substrate and having the active matrix substrate fabrication be strictly conventional. The control capacitors are fabricated on a second substrate containing the common electrode. The separation of the active matrix array and the control capacitor array between the two display glass substrates, permits each array to be fabricated with conventional techniques under its own optimum conditions to achieve high performance and yield, and low cost.

SUMMARY OF THE INVENTION

The present invention is a structure and method of fabricating the active matrix displays with halftone grayscale and a wide viewing angle. In the related art, the subpixels are defined in the conventional active matrix. In the invention, the subpixels are defined by the common electrode substrate. The active matrix in the invention defines just the pixels. The invention includes separating the active matrix array from the control capacitor array. Splitting the fabrication and number of process steps between the active matrix substrate and the common electrode substrate, increases control over the manufacturing process, optimizes design parameters and permits noncritical, conventional fabrication.

BRIEF DESCRIPTION OF THE DRAWINGS

FIG. 3b is an electrical equivalent of the pixel in FIG. 3a.

FIG. 13 is a diagram outlining the method of fabrication.

DESCRIPTION OF THE PREFERRED EMBODIMENTS

Figure 1:
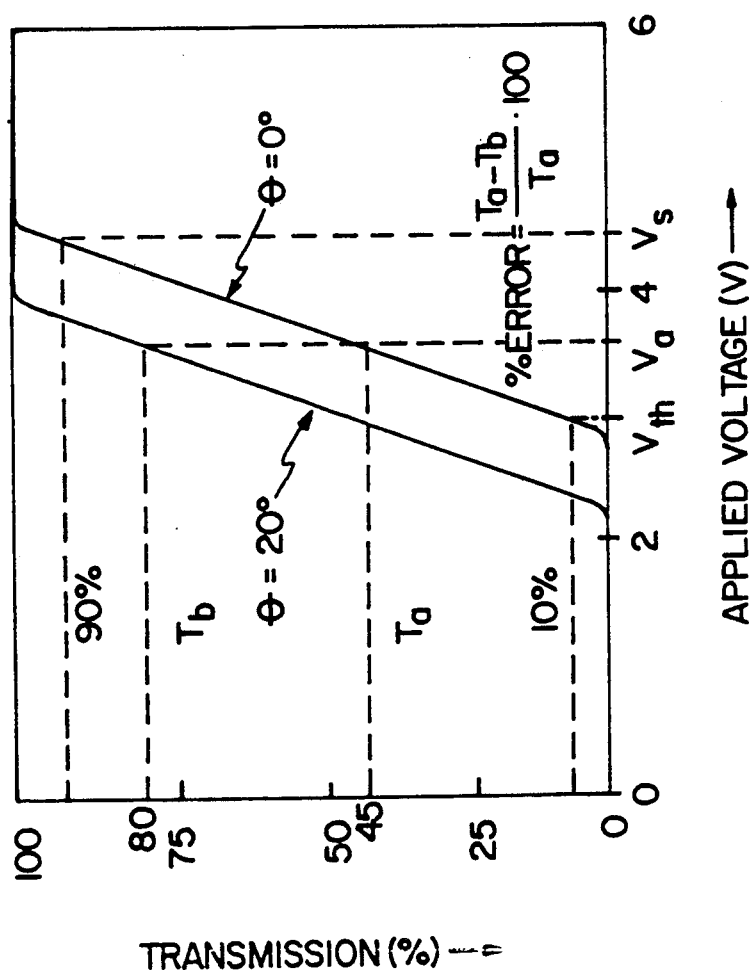
FIG. 1 is a graph revealing viewing angle dependence of transmission versus applied voltage of a typical twisted nematic liquid crystal display, with parallel polarizers.

FIG. 1 is a graph revealing viewing angle dependence of transmission versus applied voltage of a typical twisted nematic liquid crystal display with parallel polarizers. The graph indicates the percent of transmission (T) of a pixel versus applied voltage for a viewing angle ($\phi$) of 0 and 20 degrees relative to the display normal. For voltage $V_a$, the transmission $T_a$ for 0 degree viewing is about 45 percent and $T_b$ for 20 degree viewing is about 80 percent. This results in a grayscale error of $-78\%$, i.e., $((45-80)/45) \times 100\%$. Large grayscale errors limit the viewing angle. Voltage corresponding to a transmission of 10% is taken as the threshold voltage ($V_{th}$), and the voltage corresponding to 90% transmission is taken as the saturation voltage ($V_s$).

Figure 2A:
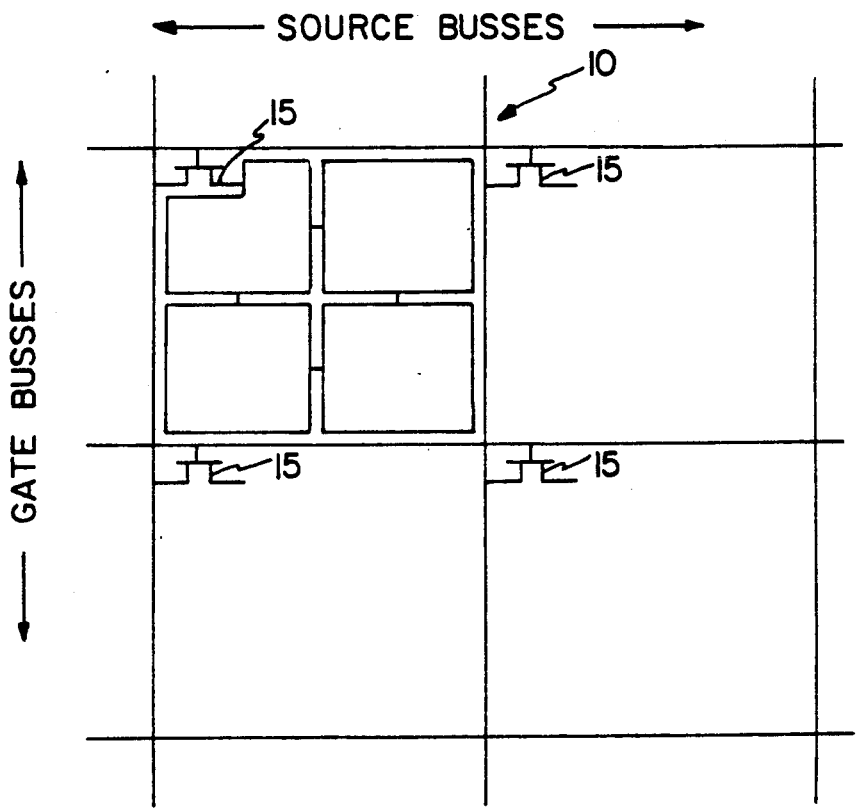
FIG. 2a is a schematic of a related art pixel.
Figure 2B:
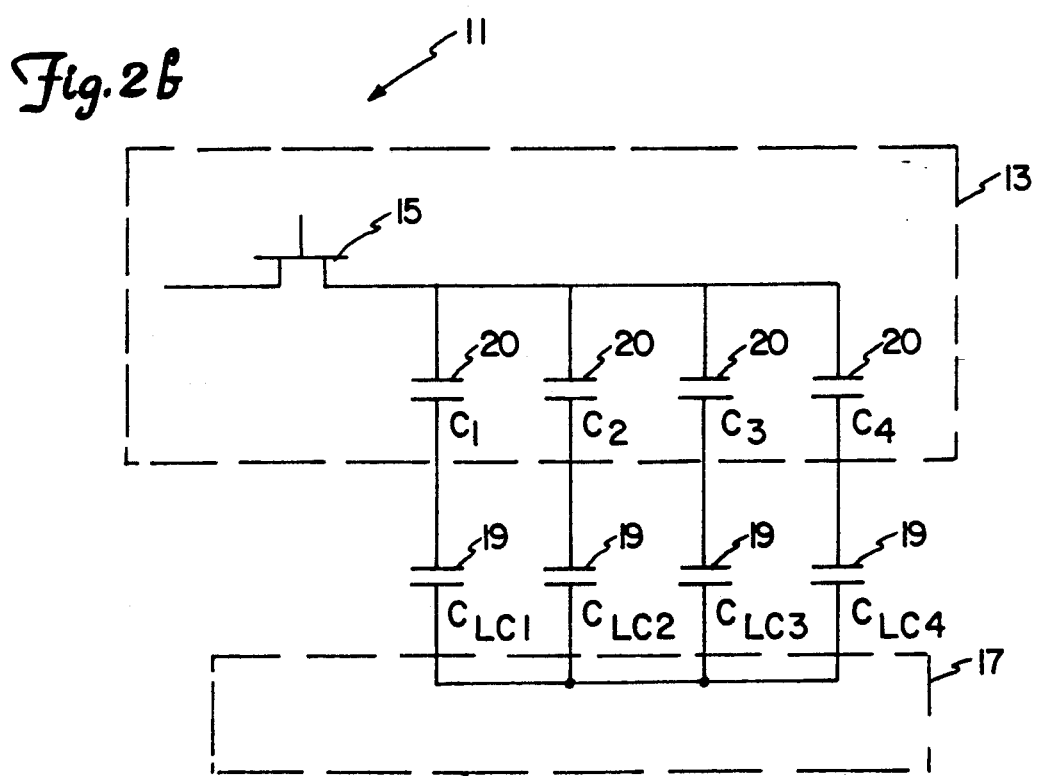
FIG. 2b is an electrical equivalent of the pixel in FIG. 2a, according to the related art.

FIG. 2a is a diagram of related-art active matrix array 10. FIG. 2b is a schematic of electrical equivalent 11 of the half-tone pixel in FIG. 2a. Thin film transistors (TFTs) 15 and control capacitors 20 are both fabricated on substrate 13. Common electrode substrate 17 is merely the common conductor. Capacitors 19 represent the capacitances between substrates 13 and 17, which is a consequence of the liquid crystal display pixels.

In the related art, there is a technique for generating grayscales in AMLCDs having a wide viewing angle, using a half-tone approach. The half-tone approach is based on the fact that the electro-optic response of liquid crystals is essentially independent of the viewing angle when the applied voltage is less than the threshold voltage, $V_{th}$, or greater than the saturation voltage, $V_s$, as illustrated in FIG. 1.

The pixel half-toning is accomplished by subdividing each pixel into a number of subpixels, and incorporating a control capacitor in series with each subpixel as shown in FIG. 2b. Control capacitors 20 and the active matrix array 10 are fabricated at the same time on same substrate 13. Control capacitors 20 act as voltage dividers. By using a proper choice of values for control capacitors 20, the voltages across the subpixels are varied such that, as each subpixel is selected to be turned-on, the voltage across it is at or above $V_s$, while the unselected pixels are at or below $V_{th}$. Thus, for any gray level selected by varying TFT 15 source voltage, at the most, only one subpixel voltage will be between $V_{th}$ and $V_s$. This significantly reduces the pixel luminance and grayscale dependencies on viewing angle. The control capacitor 20 capacitance is varied by variation in capacitor area or thickness of the dielectric in substrate 13.

Figure 3A:
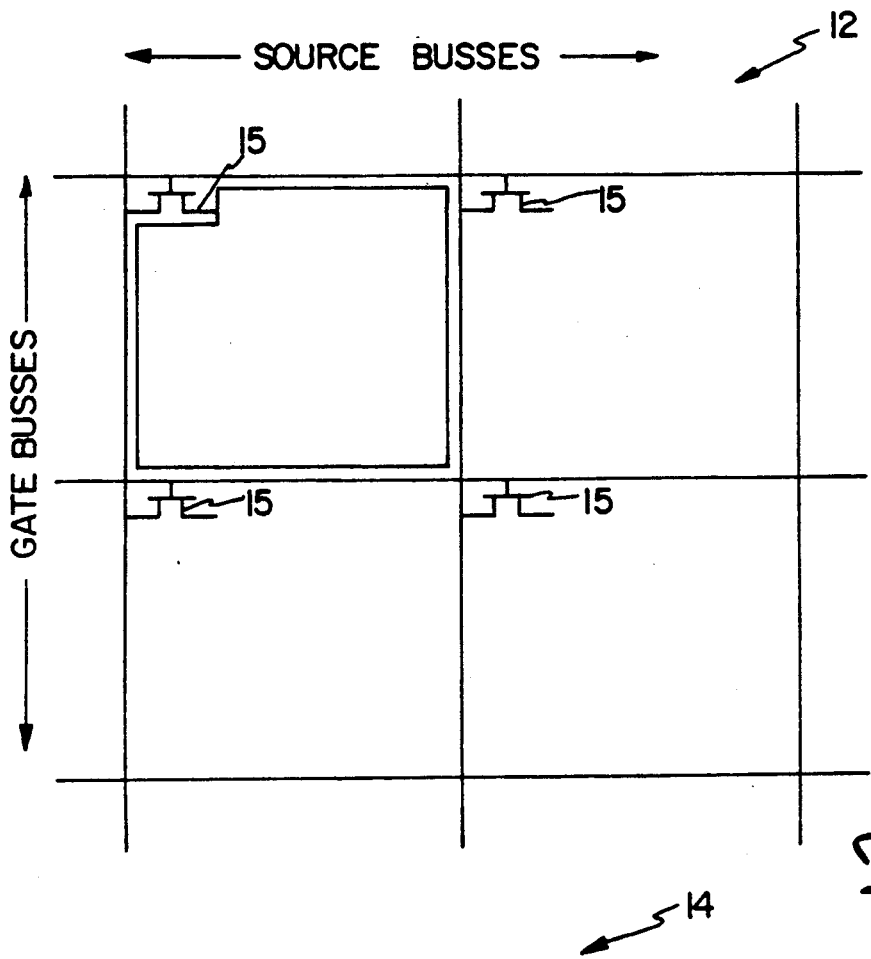
FIG. 3a is a schematic of the pixel as used in the present invention.
Figure 3B:
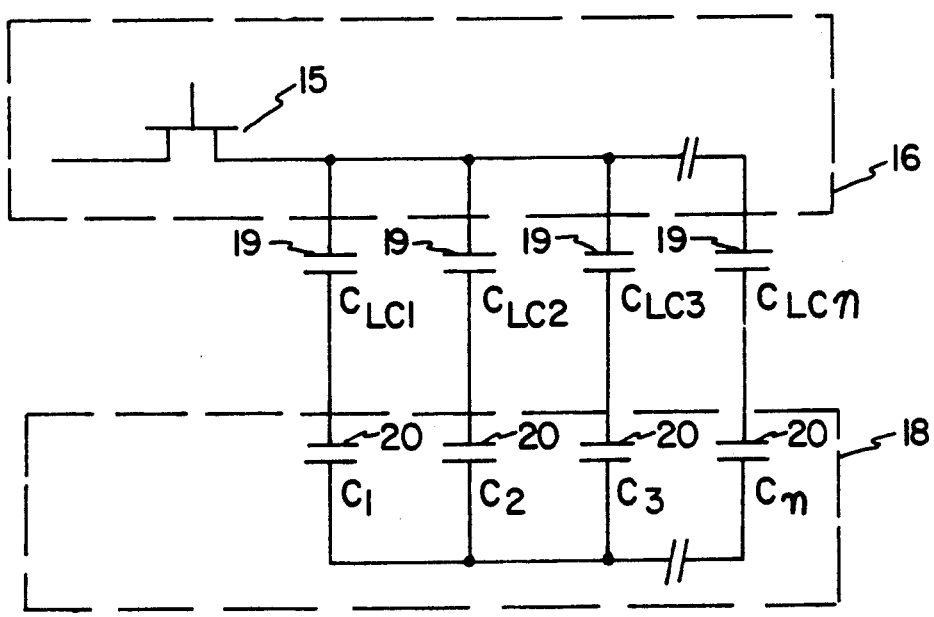

FIGS. 3a and 3b show a schematic of active matrix array 12 and electrical equivalent 14 of a pixel, according to the present invention. TFTs 15 and control capacitors 20 are fabricated on two separate substrates 16 and 18, respectively. Active matrix array 12 is fabricated on substrate 16 and control capacitor array 20 is fabricated on common electrode substrate 18. The fabrication of active matrix substrate 16 is conventional and thus can be designed and manufactured under optimum conditions for high performance and yield. Active matrix array 12 may be fabricated using a-Si TFTs, poly-Si TFTs or the like. Control capacitors 20 are fabricated on common electrode substrate 18 under optimum conditions for precise predetermined values of the control capacitor 20 capacitances and production yield.

Figure 4:
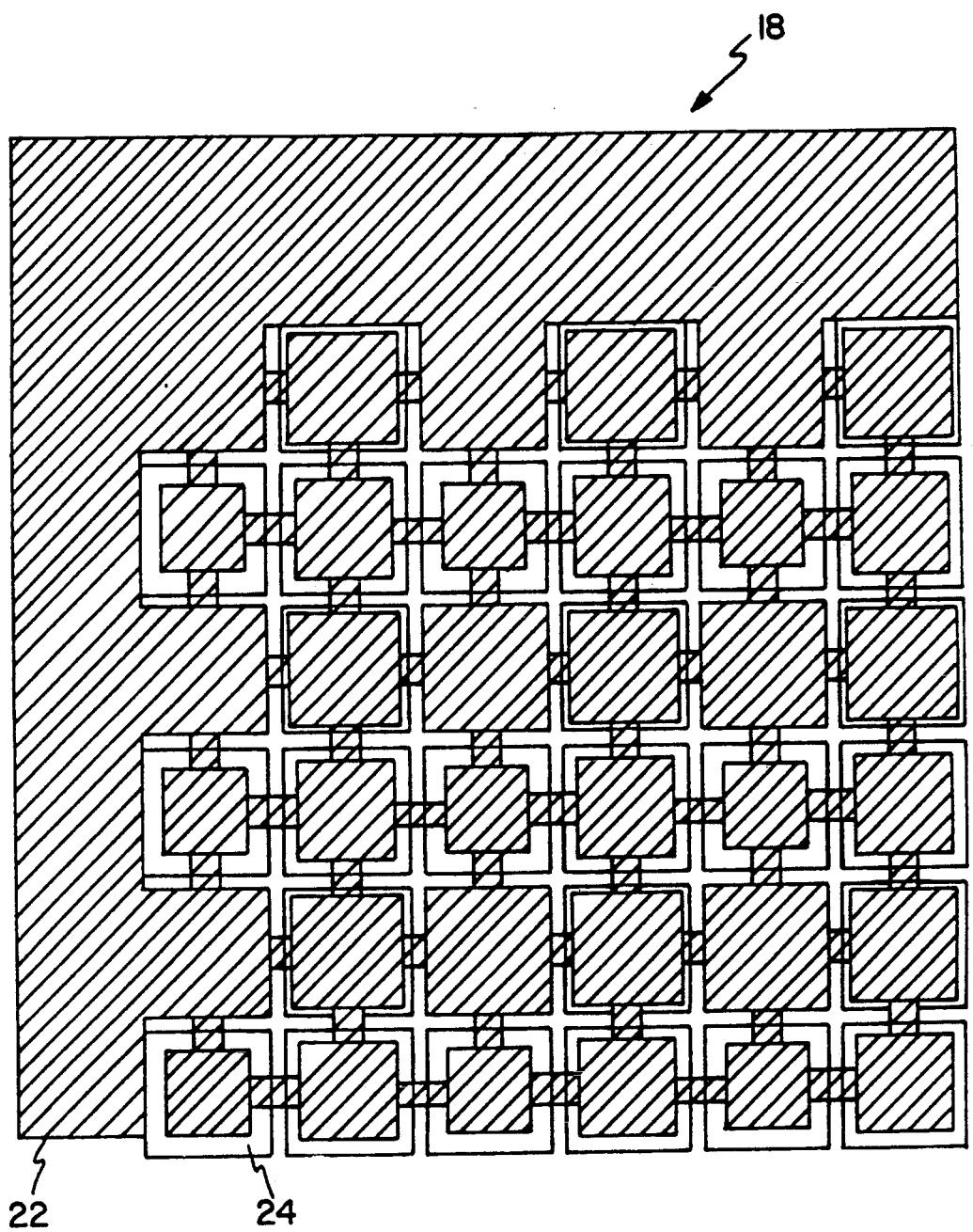
FIG. 4 is a pattern of the common electrode substrate.
Figure 5:
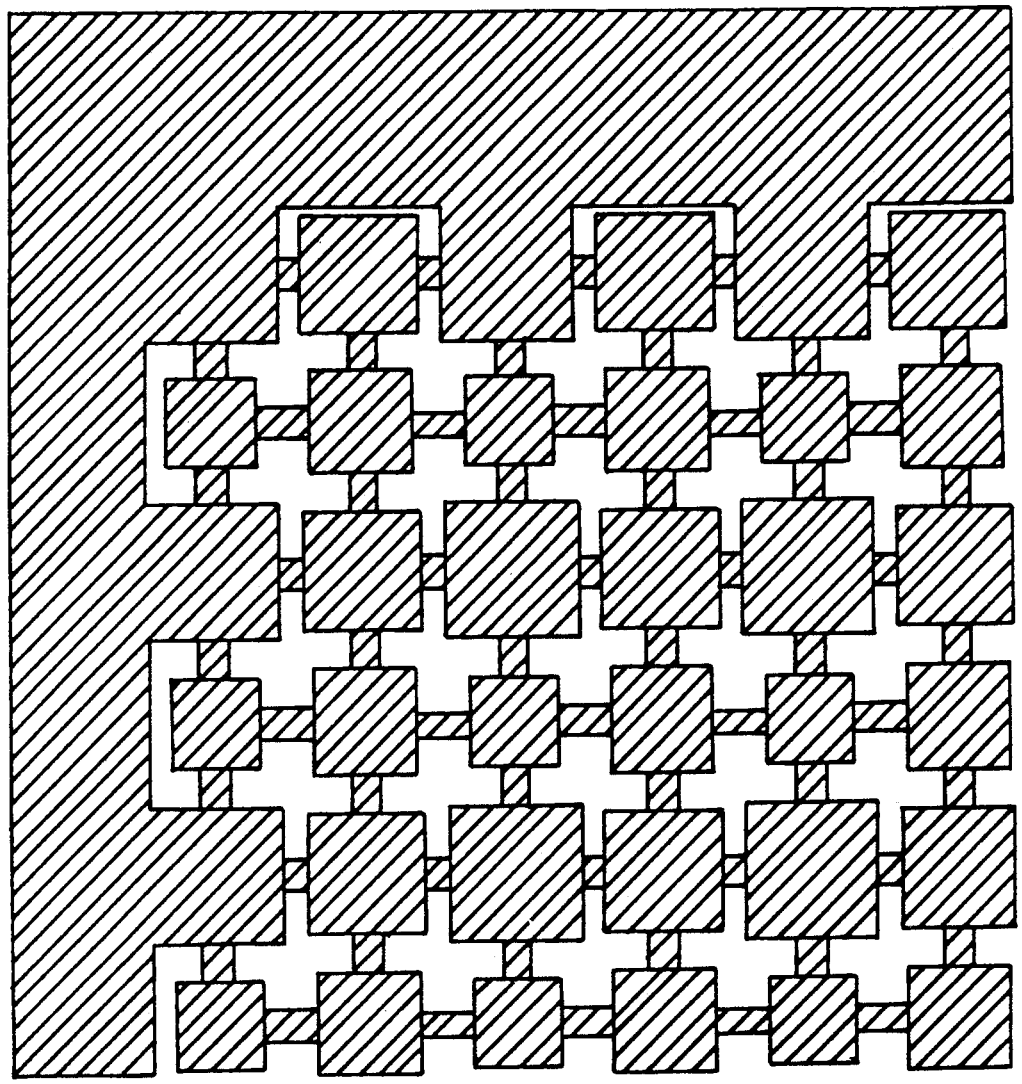
FIG. 5 is the first ITO layer pattern in the fabrication of the common electrode substrate.
Figure 6:
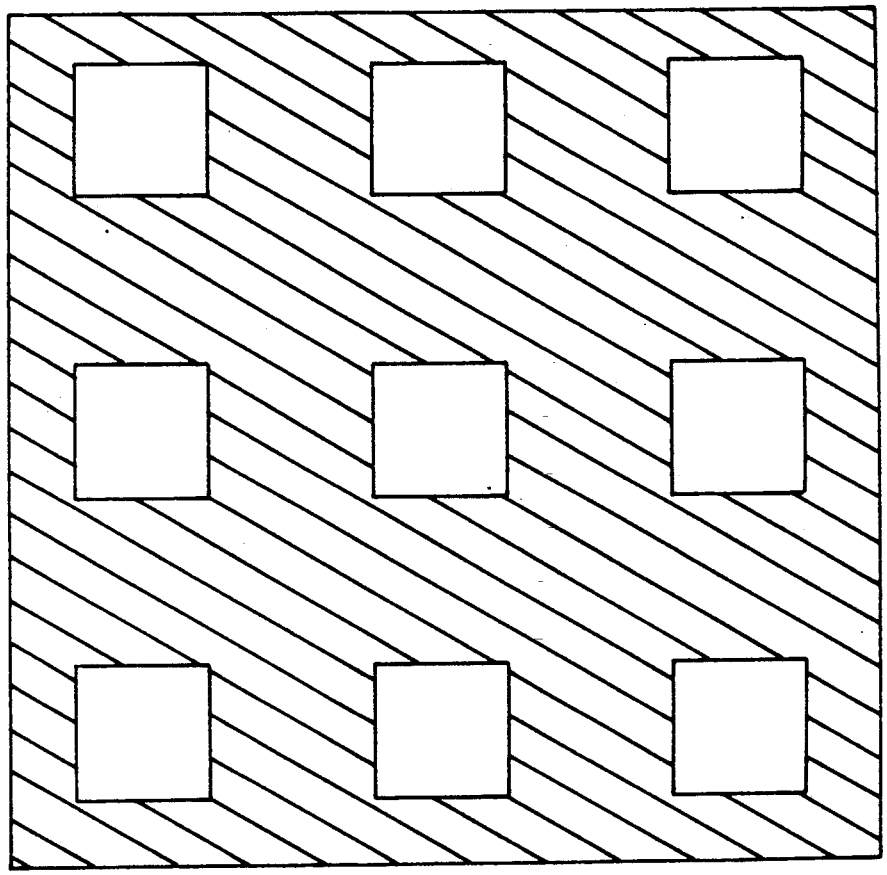
FIG. 6 reveals the pattern in the dielectric layer for the control capacitors.

FIG. 4 shows the schematic of common electrode substrate 18. Each corresponding pixel is divided into four subpixels. An overlay of three thin film layers used to fabricate control capacitors 20 is revealed in FIG. 4. Hatched portion 22 represents the first indium tin oxide (ITO) pattern on the common electrode substrate. First pattern 22 is separately illustrated in FIG. 5. Plane pattern 24 indicates the second ITO pattern of series capacitors 20 on substrate 18. Pattern 24 is separately illustrated in FIG. 7. Between patterns 22 and 24 is a dielectric of pattern 26 as illustrated in FIG. 6.

Figure 7:
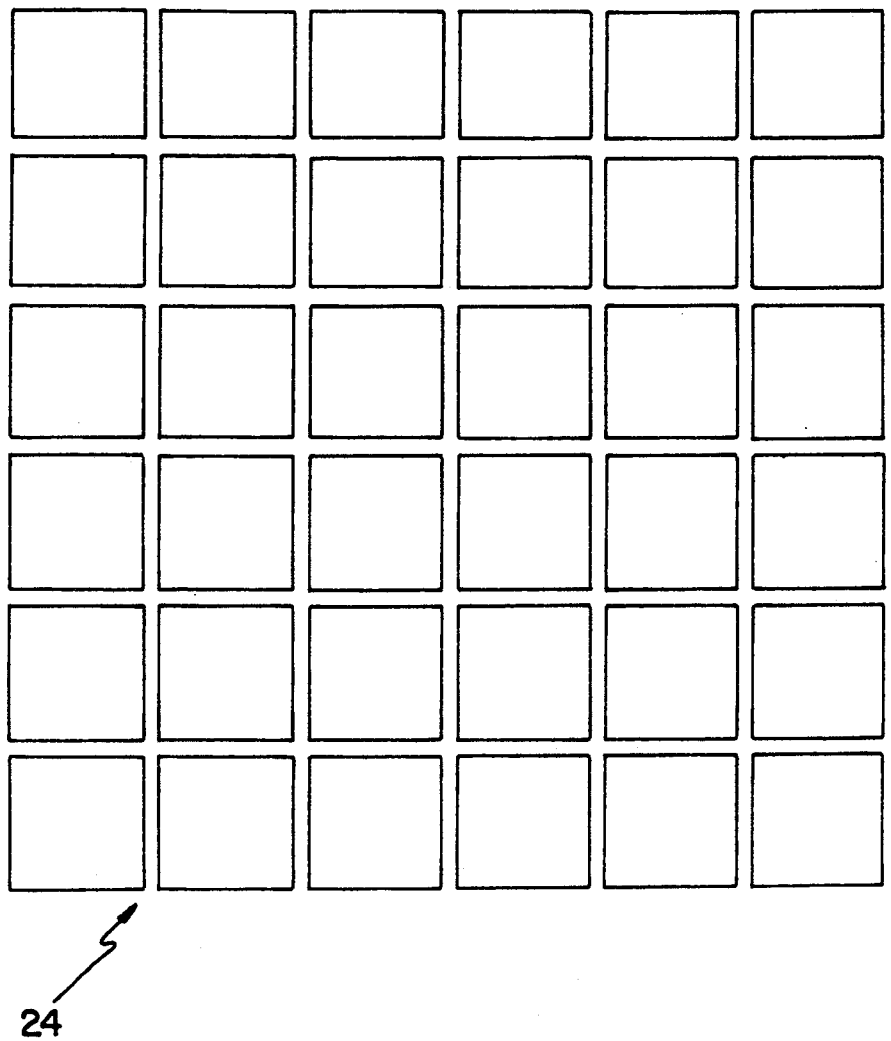
FIG. 7 reveals the second ITO layer pattern in the fabrication of the common electrode substrate.

A method of fabrication is shown in FIG. 13. Substrate 18 is fabricated, starting with Corning 7059 glass, according to the following steps: 1) Sputter deposit 300 angstroms of indium tin oxide (ITO) at 300° C. and anneal at 400° C., for 30 minutes. Photolithographically pattern and etch to define the area of control capacitors 20 as shown in FIG. 5. Thus, this ITO 22 layer serves as a common electrode as well as to define the control capacitor 20 areas. 2) Plasma deposit 12,000 angstroms of silicon nitride dielectric. Photolithographically pattern and etch as shown in FIG. 6. This pattern serves to remove a series control capacitor in one of the subpixels in the pixel. This subpixel will be the first one to turn-on, as the source voltage of the TFT is increased. 3) Sputter deposit a second ITO layer, 300 angstroms thick, at 300° C., and anneal at 400° C., for 30 minutes. Photolithographically pattern and etch to define the subpixels as shown in FIG. 7. The above process completes the fabrication of control capacitors 20 on common electrode substrate 18.

Figure 8A:
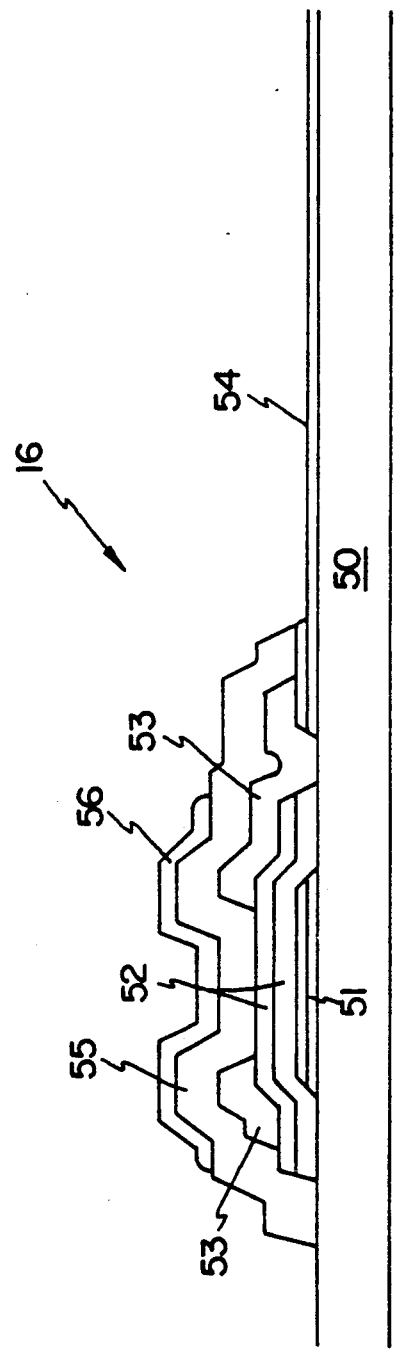
FIGS. 8a and 8b show a cross-section through a TFT at a pixel and a plan view of the pixel and the TFT, respectively.
Figure 8B:
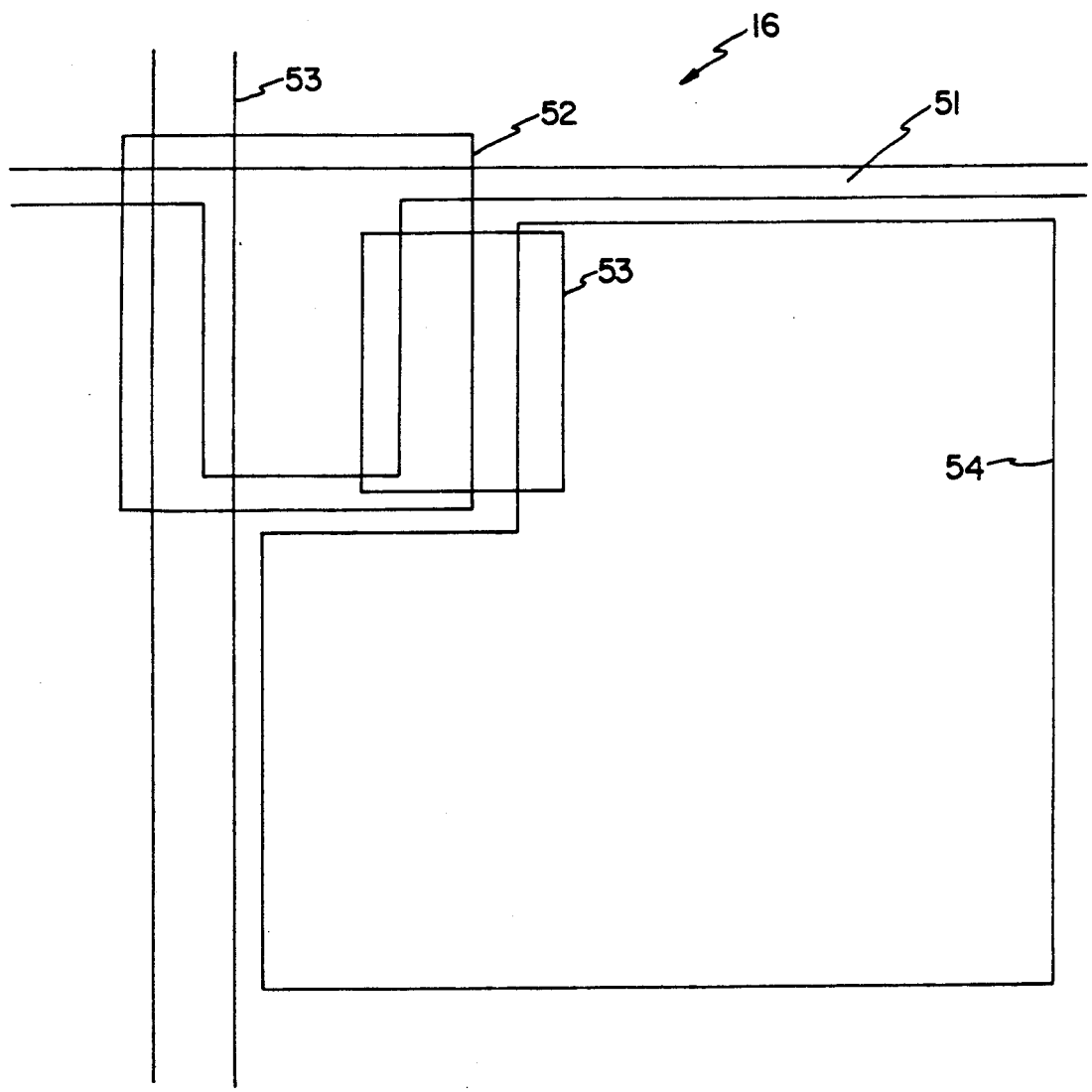

Active matrix substrate 16 is fabricated conventionally under optimum conditions to obtain high process yields. An a-Si TFT with an inverted staggered structure is employed in the active matrix substrate 16 as shown in FIGS. 8a and 8b. FIG. 8a shows a cross-section through the TFT at a pixel. FIG. 8b shows the plan view of a pixel with the TFT. Substrate 16 is fabricated, starting with Corning 7059 glass 50, according to the following steps: 1) Sputter deposit 300 angstroms of indium tin oxide (ITO) at 300° C. and anneal at 400° for thirty. Let the substrate cool to 300° C., and sputter deposit 1200 angstroms of nichrome. Photolithographically pattern and etch the nichrome and the ITO to define pixels 54 and gate busses 51. 2) Deposit 3000 angstroms of silicon nitride and 1000 angstroms of amorphous silicon sequentially by plasma enhanced chemical vapor deposition (PECVD) at 250° C. Photolithographically pattern and etch the silicon nitride and the amorphous silicon to define transistor islands 52. 3) Sputter deposit 5000 angstroms of aluminum alloy (4% copper and 1% silicon). Photolithographically pattern and etch the aluminum alloy to define source 53 and drain 53. 4) Deposit 10,000 angstroms of silicon dioxide for a passivation layer by PECVD at 250° C. 5) Sputter deposit 1500 angstroms of aluminum alloy for a light shield. 6) Photolithographically pattern and etch light shield layer 56. 7) Photolithographically pattern and etch passivation layer 55 to clear pixels 54, and then etch the nichrome from pixels 54. Light shield layer 56 and passivation layer 55 are not shown in FIG. 8b for the sake of clarity. The above process completes the fabrication of active matrix substrate 16.

Figure 9:
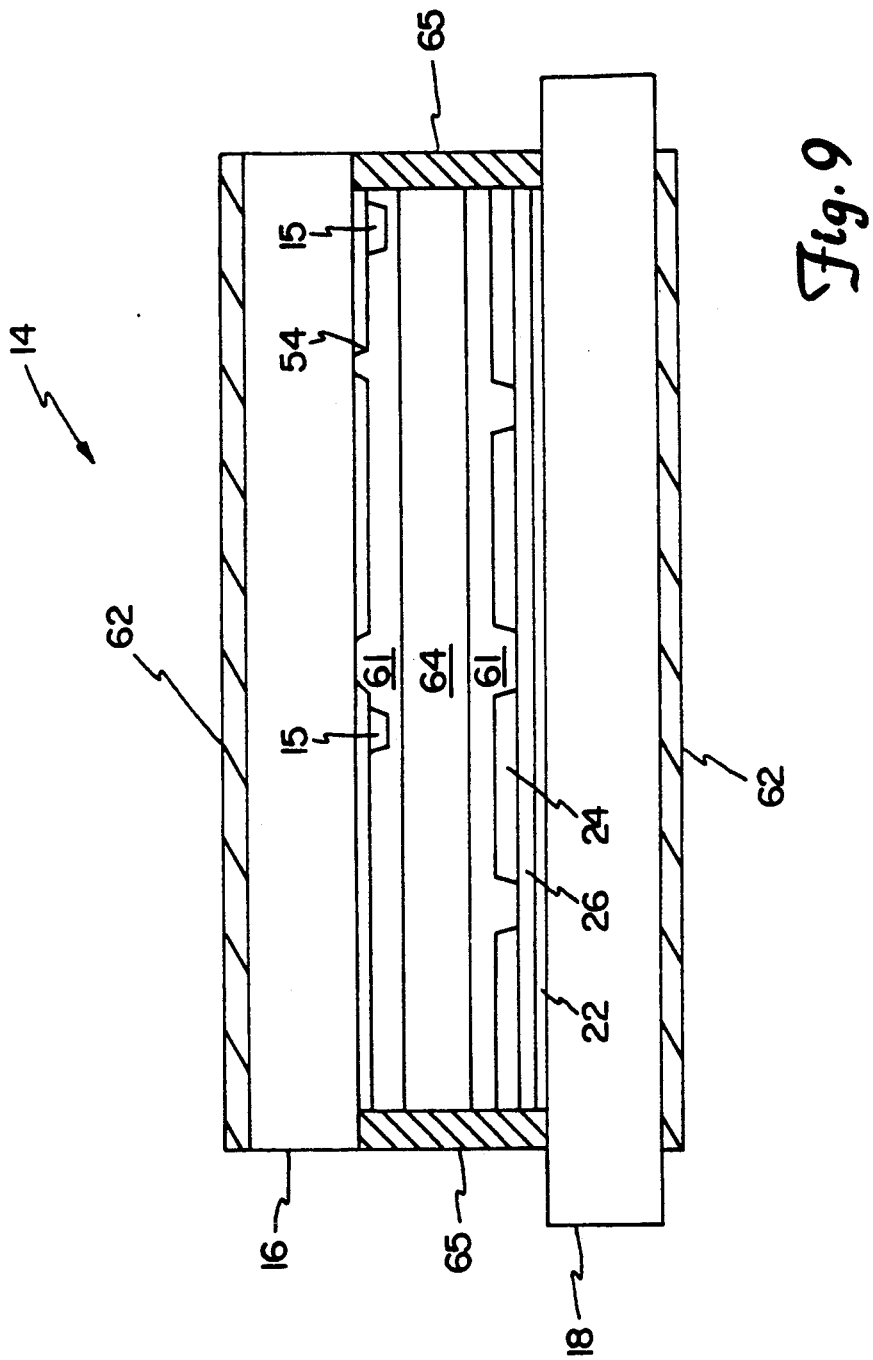
FIG. 9 is a cross-section of liquid crystal material sandwiched between an active matrix substrate and a common electrode substrate, using spacers for maintaining desired cell spacing.
Figure 10:
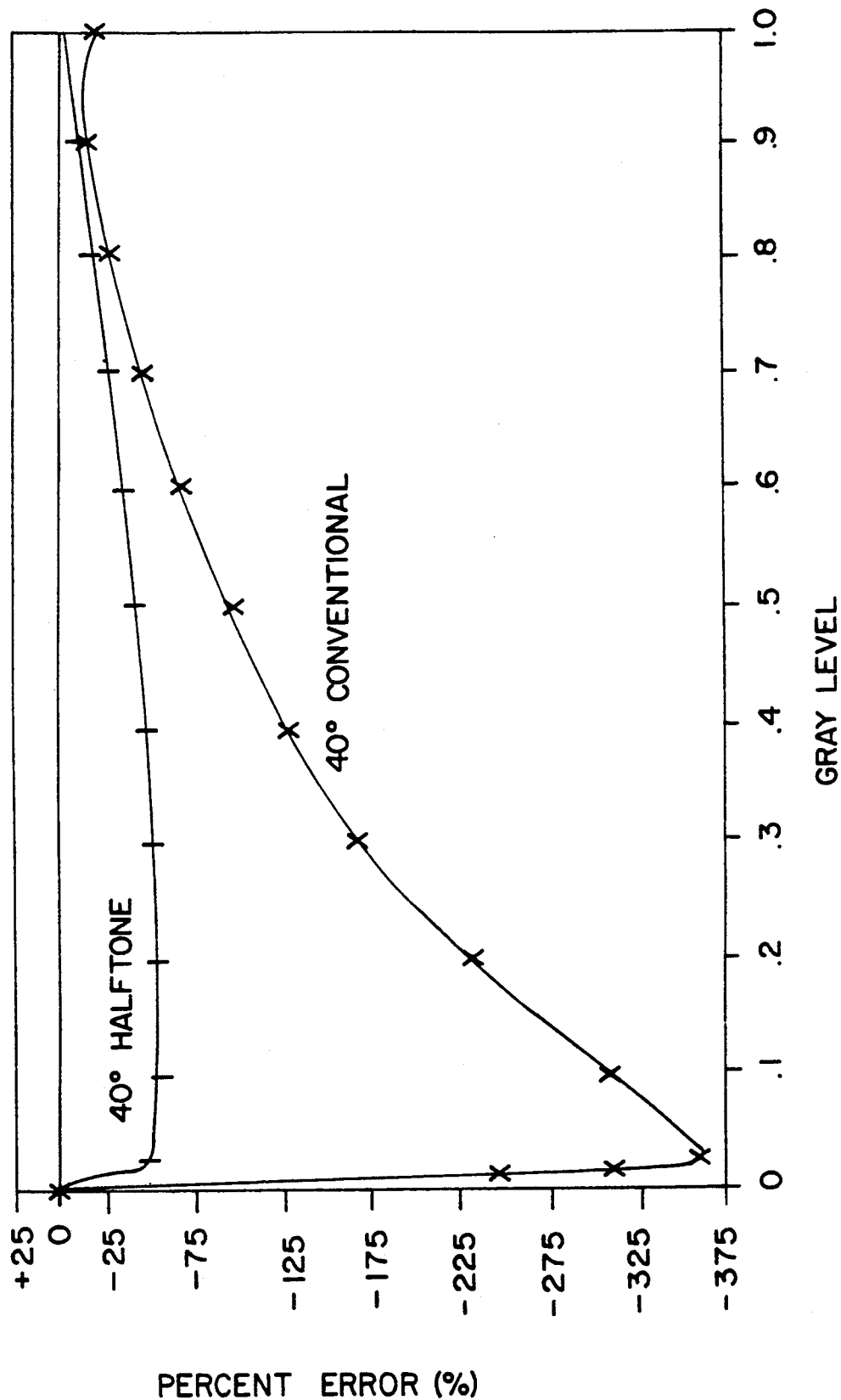
FIG. 10 is a comparison of grayscale errors of the present invention and the conventional related art, for a 40 degree viewing angle.

Active matrix display 14 is then assembled as shown in FIG. 9. FIG. 9 shows liquid crystal material 64 sandwiched between active matrix substrate 16 and common electrode substrate 18, using spacers 65 to maintain the desired cell spacing. A MERCK 2861 liquid crystal material is employed in display 14 with a cell spacing of 4 microns. Liquid crystal alignment layer 61 on both substrates is created by a mechanically rubbed polyimide layer. Polarizers 62 are attached to the outer surfaces of display 14 (i.e., the outer surfaces of substrates 16 and 18) in a parallel orientation. Assembled display 14 is then tested for grayscale errors as a function of viewing angle. A substantial improvement in grayscale accuracy has been observed in halftone display 14 when compared to a conventional display. For instance, for a 40 degree viewing angle, the grayscale errors, as shown in FIG. 10, were better than $-50\%$ for halftone display 14, whereas they were as high as $-350\%$ for a conventional display.

Figure 11:
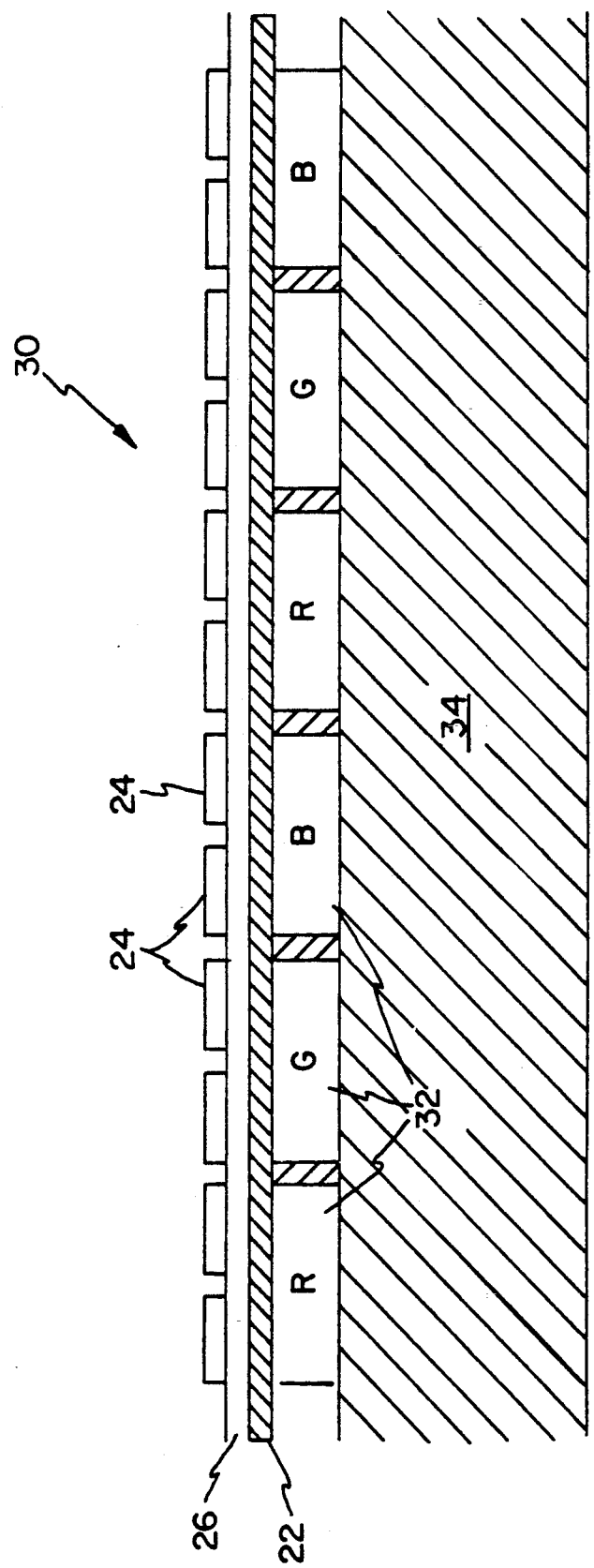
FIG. 11 shows an embodiment of the invention with color filters.

FIG. 11 shows a cross-section of a completely fabricated common electrode substrate 30 of the invention, using color filters 32 for full-color operation. The cross-section reveals a common electrode substrate containing color filter array 32, as well as a control capacitor 20 array composing first ITO pattern 22, dielectric 26, and second ITO pattern 24, as set on glass substrate 34. The electrodes are part of pattern 24 and define the subpixels. Active matrix substrate 16 is registered with respect to pattern 24, during the display 14 assembly, with the liquid crystal material.

Figure 12:
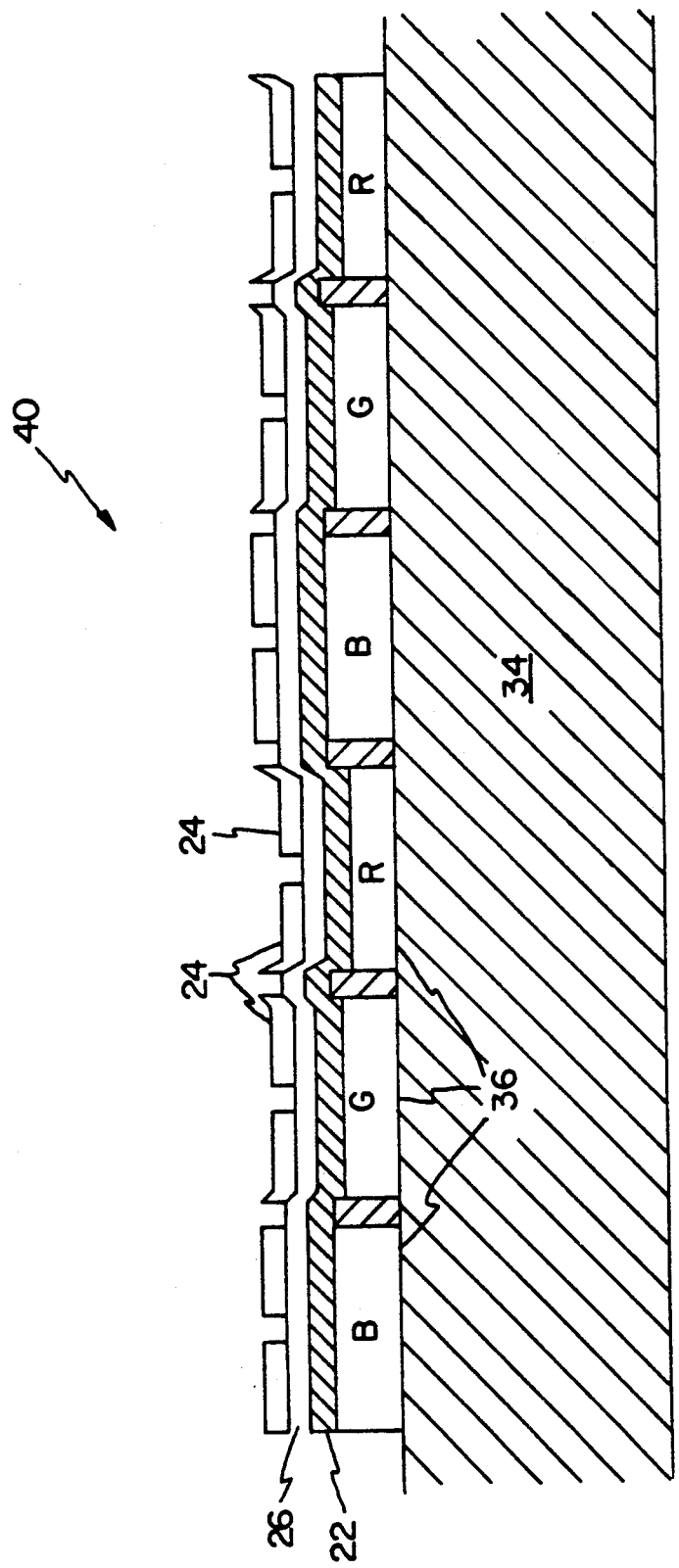
FIG. 12 shows an embodiment of the invention with variable-thickness, color filters for variable cell gap displays.

FIG. 12 shows common electrode substrate 40 using color filters 36 with various thicknesses. The cross-section through the common electrode substrate is revealed. The thickness variation of color filters 36 results in a variation of the liquid crystal cell thickness for different colors for enhanced contrast. Other structural features of display 40 are like those of common electrode substrate 30.

It is thus seen from the foregoing that there is provided a structure and method for manufacturing wide viewing angle, active matrix displays with halftone grayscale with high performance, high manufacturing yield, and low cost. The foregoing detailed description is intended to be exemplary rather than limiting, and the description sets forth the best mode contemplated by the inventor of carrying out his invention. Numerous modifications and variations to the present invention will be obvious to those skilled in the art without deviating from the spirit of the invention. Accordingly, all such variations and modifications to present invention are deemed to fall within the scope of the present invention.

I claim:

1. A wide viewing angle, active matrix liquid crystal display having halftone grayscale, comprising:
   a plurality of pixels on a first substrate;
   a plurality of transistors on the first substrate, wherein each transistor of said plurality of transistors is connected to a corresponding pixel of said plurality of pixels; and
   a plurality of control capacitor groups on a second substrate wherein:
   each control capacitor group has a plurality of control capacitors;
   each control capacitor group corresponds to a pixel of said plurality of pixels;
   each control capacitor of each control capacitor group defines a subpixel and is connected in series to a capacitance of the subpixel; and
   the control capacitors have a common connection.

2. A wide viewing angle, active matrix liquid crystal displaying having halftone grayscale, comprising:
   a first glass substrate;
   a first layer of indium tin oxide deposited on said first glass substrate and having an etched pattern that defines an area for control capacitors, and serving as a common electrode for the control capacitors;
   a first layer of silicon nitride dielectric deposited on said first layer of indium tin oxide, having an etched pattern that defines the dielectric for the control capacitors;
   a second layer of indium tin oxide deposited on said first layer of silicon nitride dielectric, having an etched pattern that defines areas for subpixels;
   a first alignment layer of polyimide deposited on said second layer of indium tin oxide; and
   color filters inserted between said first substrate and said first layer of indium tin oxide, for full color operation.

3. Apparatus of claim 2 wherein said color filters have varied thicknesses for enhancing contrasts of said display.

4. Apparatus of claim 2 further comprising:
   a second glass substrate;
   a third layer of indium tin oxide deposited on said second glass substrate;
   a layer of nichrome deposited on said third layer of indium tin oxide, wherein said third layer of indium tin oxide and said layer of nichrome have an etched pattern that defines pixels, transistor gates and gate busses;
   a second layer of silicon nitride deposited on said layer of nichrome;
   a layer of amorphous silicon deposited on said second layer of silicon nitride, wherein said second layer of silicon nitride and said layer of amorphous silicon have an etched pattern that defines transistor islands;
   a first layer of aluminum alloy deposited on said second layer of silicon nitride and layer of amorphous silicon, having an etched patter defining transistor sources and drains;

a passivation layer of silicon dioxide deposited on said first layer of aluminum alloy;

a second layer of aluminum alloy deposited on said passivation layer, having an etched pattern defining a light shield, wherein said passivation layer has an etched pattern clearing the pixels from said passivation layer and said layer of nichrome;

a second alignment layer of polyimide deposited on said third layer of indium tin oxide; and a layer of liquid crystal material sandwiched between said first and second alignment layers of polyimide, resulting in said active matrix liquid crystal display.

5. Apparatus of claim 4 further comprising:

spacers situated between said first and second substrates to maintain desired spacing;

a first layer of polarization material attached to said first substrate; and a second layer of polarization material attached to said second substrate.

6. Apparatus of claim 5 wherein:

said first layer of indium tin oxide is about 300 angstroms thick;

said first silicon nitride dielectric is about 12,000 angstroms thick;

said second layer of indium tin oxide is about 300 angstroms thick;

said third layer of indium tin oxide is about 300 angstroms thick;

said layer of nichrome is about 1200 angstroms thick;

said second layer of silicon nitride is about 3000 angstroms thick;

said layer of amorphous silicon is about 1000 angstroms thick;

said first layer of aluminum alloy is about 5000 angstroms thick;

said passivation layer is about 10,000 angstroms thick; and said second layer of aluminum alloy is about 1500 angstroms thick.

7. Apparatus of claim 6 wherein said color filters have varying thicknesses.

* * * * *

UNITED STATES PATENT AND TRADEMARK OFFICE
CERTIFICATE OF CORRECTION

PATENT NO. : 5,191,452
DATED : Mar. 2, 1993
INVENTOR(S) : KALLURI R. SARMA

It is certified that error appears in the above-indentified patent and that said Letters Patent is hereby corrected as shown below:

Column 6, line 67, cancel "patter", and substitute --pattern--.

Signed and Sealed this

Twenty-fifth Day of October, 1994

Attest:

BRUCE LEHMAN

Attesting Officer

Commissioner of Patents and Trademarks